Figure 1:
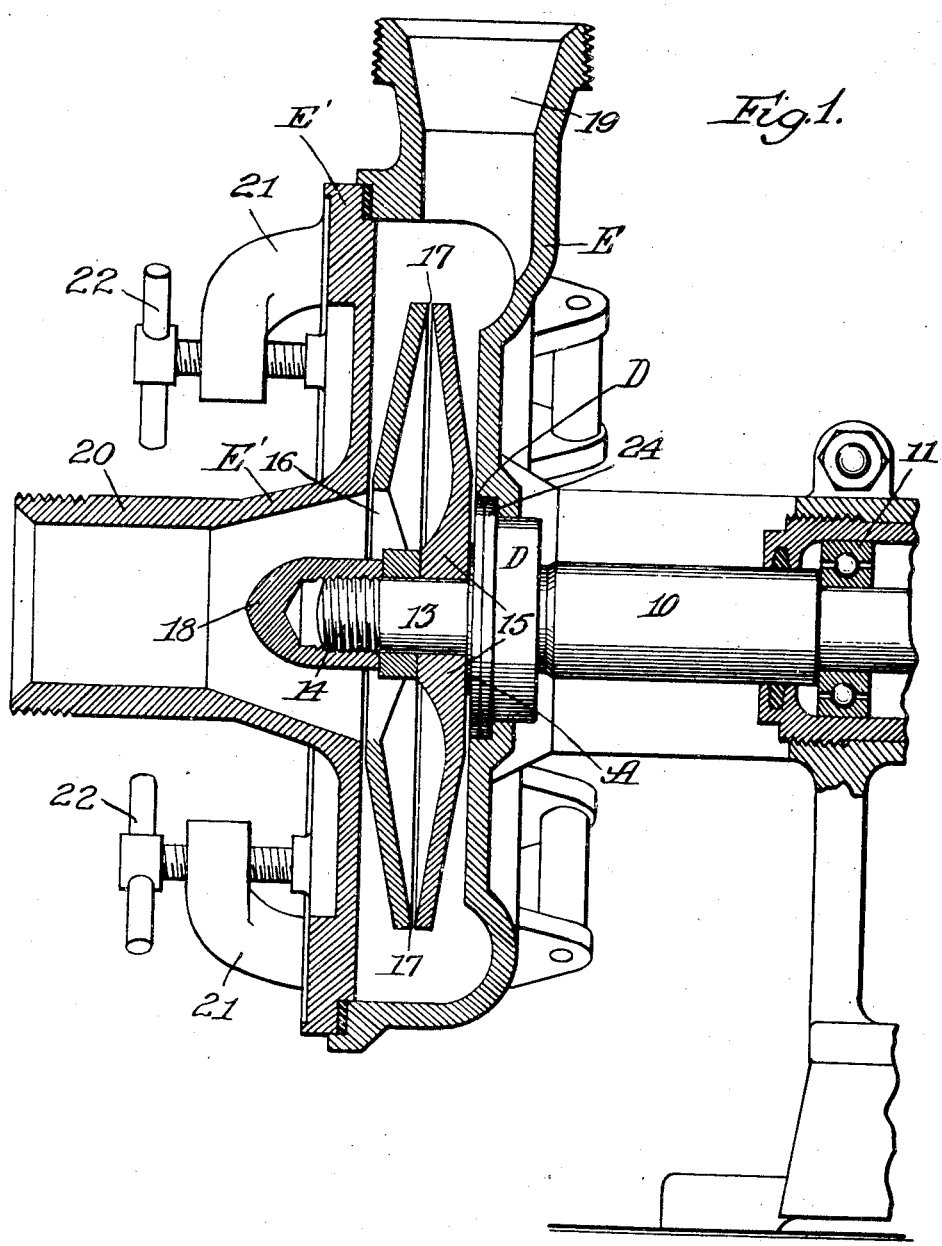

Jan. 11, 1944.  C. A. NAMUR  2,339,099
ROTARY SEAL FOR PUMPS
Filed Dec. 14, 1940  2 Sheets-Sheet 1

Inventor:
Carl A. Namur,
By Chritton, Wiles, Davies, Kirschill & Dawson,
Attys.

Jan. 11, 1944.                C. A. NAMUR                2,339,099
                           ROTARY SEAL FOR PUMPS
                  Filed Dec. 14, 1940            2 Sheets-Sheet 2
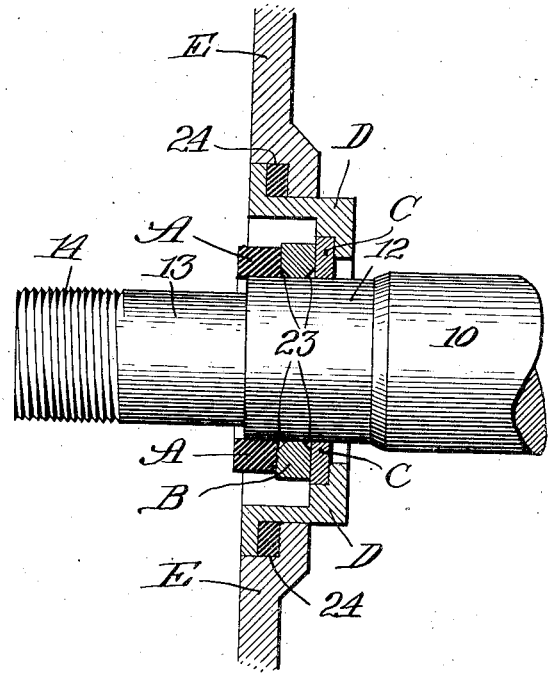
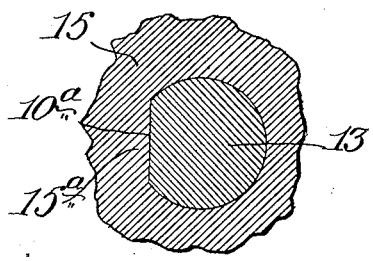
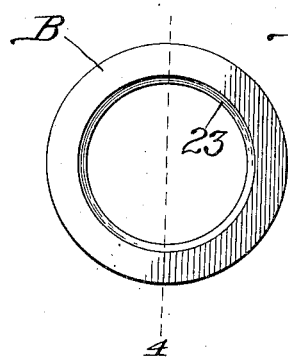 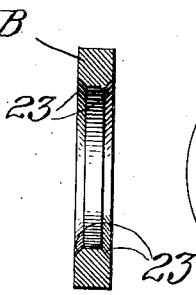 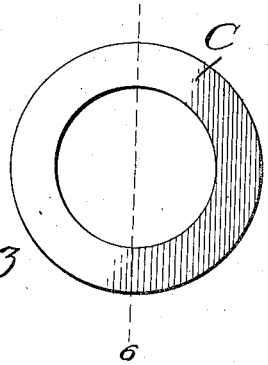 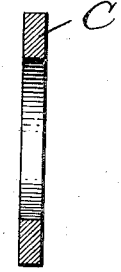
Inventor:
Carl A. Namour,
By Chritton, Wiles, Davies, Hirsch & Dawson,
Att'ys Patented Jan. 11, 1944

2,339,099

UNITED STATES PATENT OFFICE 2,339,099

ROTARY SEAL FOR PUMPS

Carl A. Namur, Kenosha, Wis., assignor to Specialty Brass Company, Incorporated, Kenosha, Wis., a corporation of Wisconsin Application December 14, 1940, Serial No. 370,193

3 Claims. (Cl. 103—111)

The invention relates to a rotary seal for pumps. It is particularly useful in connection with enclosed impeller pumps employed in pumping liquids such as milk, etc. It is applicable, however, to devices other than sanitary pumps.

An object of the invention is to provide simple and effective sealing means which may be employed with enclosed impeller pumps, whereby the back pressure created by the impeller is utilized for maintaining an effective seal. Another object of the invention is to provide a pump with internal rotary seal means whereby any sudden back pressure caused by throttling or completely shutting off the discharge side of the pump serves merely to make the seal more effective. A further object is to provide a pump and an internal rotary seal mechanism in which springs are entirely done away with and in which a minimum of parts is employed for effectively maintaining the seal. Other specific objects and advantages will appear as the specification proceeds.

The invention is described in its preferred embodiment by the accompanying drawings, in which—

Figure 1 is a longitudinal sectional view of a pump casing and impeller equipped with sealing means embodying my invention; Fig. 2, a broken view showing in section the parts enclosing the drive shaft for effecting a seal thereof; Fig. 3, a plan view of the sealing ring; Fig. 4, a section thereof; Fig. 5, a plan view of the stationary ring carried by the retaining ring of the casing; Fig. 6, a section thereof; and Fig. 7, a cross sectional view of the impeller and impeller shaft, showing the flat surfaces thereof in contact.

It has been common heretofore in sanitary centrifugal pumps to use pack stuffing boxes. However, with a pack stuffing box there is a possibility of milk entering, and, since the stuffing box is rather difficult to clean, an insanitary condition may result.

It has also been common to use external rotary seals, that is, seals located outside the pump housing. In such structures, pressure between the rotary and stationary part is applied by a spring.

This style of seal is employed on a pump with an open impeller which produces a suction or reduced pressure at the place where the shaft enters the pump housing. The difficulty with this structure, however, is that should the valve or the discharge side of the pump be suddenly throttled or completely shut off the high pressure developed tends to force the external type of rotary seal open, thus causing a spurt of liquid.

In order to take care of such periods of high pressure, it is necessary to use a high spring tension, a spring tension which is much greater than need be applied under ordinary operating conditions. Thus for a greater period of the time the seal is creating excessive friction over that which is needed.

I have found that with a pump having an enclosed or shrouded impeller a simple rotary seal structure may be employed on the inside of the pump, which does not require excessive spring tension or, in fact, any spring tension whatsoever, while at the same time the above periods of high pressure are utilized to increase the sealing effect. A pump with an enclosed impeller produces a pressure at the point where the shaft enters the housing, which is just opposite that produced by an open impeller.

With a shrouded or partially shrouded centrifugal impeller, there is a pressure at the place where the pump shaft enters the housing which is practically equal to the discharge pressure of the pump. This pressure is utilized for forcing the few simple sealing parts, which will be described hereinafter in detail, together and thus producing an effective seal.

Any suitable type of pump may be employed. In the illustration given, I have shown a pump of the type described in greater detail in Patent No. 1,809,526. It is believed unnecessary to describe the pump in great detail.

The drive shaft of the pump is indicated by the numeral 10, and it is mounted in the bearing 11, the bearing and support therefor being of well known construction. Any suitable power, such as, for example, a motor may be employed for driving the shaft 10. Shaft 10 is reduced at 12 to provide a bearing surface for receiving the sealing members which will be later described. The shaft is further reduced at 13 to provide a surface for supporting the impeller, and the extreme end of the shaft is threaded at 14.

As shown more clearly in Fig. 1, an impeller 15 of the enclosed type is provided centrally with an apertured hub which is received about the shaft portion 13. The impeller is provided at its front side with an inlet opening 16 aligned with the inlet 20. The impeller has a peripheral discharge opening 17. A threaded nut member 18 is employed for maintaining the impeller upon the shaft 10.

The casing E of the pump may be of any suitable construction. In the illustration given, it provides, together with the front plate E', an impeller chamber for receiving the impeller 15 and the liquid discharged therefrom. The casing is provided with an outlet 19. The removable front plate E' is provided with an inlet pipe 20. Threaded bosses 21 carried by the casing E receive the clamp members 22, which are employed for releasably locking the front plate E' in position.

The seal can be seen more clearly in the sectional view shown in Fig. 2. It will be observed that a resilient drive ring A is received about the forward portion 12 of the shaft 10 and extends beyond the portion 12 to a position around the reduced portion 13 of the shaft 10. On the inside of the drive ring A is a rotating seal ring B made of bearing bronze or other suitable material. The ring B bears against the stationary ring C, which is formed of stainless steel or other suitable material.

The width of the resilient drive ring A and that of the rotating seal ring B should preferably be such that when the two rings are placed side by side in engagement with each other and with the seal ring B and in contact with the stationary ring C, the drive ring A, when uncompressed, extends beyond the forward portion 12 of the shaft 10. The rings A and B may be rotatably and slidably mounted on the shaft 10.

The drive ring A, although it may be rotatably and slidably mounted on portion 12 of the shaft 10, should be in frictional engagement with the shaft and should be so closely fitted to the shaft that it will be caused to rotate by the rotation of the shaft. The drive ring A is also in frictional engagement with the impeller 15.

The ring C is pressed into the stationary retaining ring D which is provided with an interlocking connection with the pump casing E, a resilient seal 24 being employed between the interlocking portions of the members. If desired, the ring C and stationary retaining ring D may be formed in one piece.

The impeller 15 is mounted on the reduced end 13 of the shaft 10 for axially slidable movement thereon. A flat surface 10ª on the impeller shaft 10 engages a flat surface 15ª on the inside of the impeller hub, causing the shaft and impeller to rotate together. The nut 18 is then applied to the threaded portion 14 of the shaft 10 and tightened until the impeller hub is in engagement with the resilient drive ring A. The nut 18 is then further tightened to cause the resilient drive ring A to be compressed under the pressure of the impeller hub. When the drive ring A is thus compressed, it urges the seal ring B into sealing engagement with the stationary ring C.

The impeller 15 is thus slidable longitudinally on the reduced portion 13 of the shaft 10 when the resilient drive ring A is compressed. The nut 18 on one side and the shoulder of the portion 12 of the shaft 10 on the other side provide limits for this movement on the shaft.

When the resilient drive ring A is compressed by the tightening of the nut 18, the ring is arranged so that it is subject to pressure which may be created within the impeller chamber. Thus if pressure is exerted upon the periphery of the compressed drive ring A, it will tend to force the ring closer to the portion 12 of the shaft 10 and to urge the ring B into tighter engagement with the stationary ring C.

As shown more clearly in Figs. 2 and 4, the ring B, which has a very close fit with the shaft 10, is provided on its inner side with cutaway corner portions 23. This 45° chamfer placed on each face and beginning on the inside diameter is for the purpose of allowing some relief between the shaft, the ring B, and the stationary ring C. This relief also reduces the bearing friction.

*Operation*

In the operation of the apparatus, milk enters through the inlet 20 and then passes through the impeller opening 16 into the impeller 15. It is discharged through the peripheral opening 17 and passes out through pipe 19.

The discharge of the liquid from the enclosed impeller creates a back pressure within the impeller chamber, which pressure causes the compressed drive ring A to be pressed more tightly against the seal ring B. Thus the periphery of the compressed resilient drive ring A is subjected to the same pressure as that which exists at the point of discharge of the liquid from the impeller.

This pressure against the periphery of the drive ring A urges it closer to the reduced portion 12 of the shaft 10 and causes the side of the drive ring to be more tightly pressed against the seal ring B. The rotating seal ring B, in turn, is pressed more tightly against the stainless steel stationary ring C, thus effecting a tighter seal.

As any excessive pressure is developed, the seal thereby becomes more effective. At the same time, under ordinary operating pressures, no unusual pressure or friction is found necessary, and the use of a spring is entirely avoided.

In the pumping operation, the shaft 10 is rotated by suitable power means, and the impeller 15 is driven thereby, the flat surface 10ª on the shaft engaging the flat surface 15ª of the impeller hub. The fluid pressure produced by the discharge of liquid from the impeller creates a pressure upon the ring A, causing a tightening of the seal between the rings B and C.

After the pumping operation, the pump may be readily disassembled for cleaning. Upon release of the clamp 22, the front casing member E' may be removed, and then upon the unscrewing of the nut 18 the impeller 15 may be slipped off of the shaft 10. The drive ring A and the seal ring B may now be slipped off. This leaves only the stationary parts C and D, which are readily accessible both from the inside and the outside.

In assembling the parts, the sealing ring B is slipped upon the shaft portion 12 and the resilient drive ring A slipped on the same portion of the shaft. The impeller 15 is then slipped over the portion 13, and nut 18 is threaded on the shaft and tightened until the drive ring A is compressed. Front plate E' is then placed in position and locked by means of the clamp 22. The pump is then ready for the next pumping operation.

This application is a continuation in part of my copending application Serial No. 226,999, filed August 26, 1938, for a Rotary seal for pumps.

While there are shown and described certain embodiments of the invention, it is to be understood that it is capable of many modifications. Changes, therefore, in the construction and arrangement may be made without departing from the spirit and scope of the invention as disclosed in the appended claims, in which it is intended to claim all novelty inherent in the invention as broadly as permissible in view of the prior art.

I claim:

1. A rotary seal for a drive shaft arranged in a pump casing equipped with a stationary sealing surface about said drive shaft comprising a rotatable sealing ring extending about said drive shaft adjacent said stationary sealing surface and engaging the same, a resilient drive ring extending about said drive shaft adjacent said sealing ring with one side of said drive ring frictionally engaging said sealing ring, a pumping impeller in said casing slidably mounted on said shaft and rotated thereby, the rear side of said impeller being in engagement with the other side of said drive ring, and means for moving said impeller along said shaft toward said drive ring to compress the resilient drive ring laterally along the axis of the shaft whereby the drive ring is expanded radially outwardly and the sealing ring is urged into sealing engagement with the stationary surface, the entire periphery of the drive ring being free to move radially and being exposed to the interior of the casing whereby fluid pressure within the casing may compress the drive ring radially inwardly to expand the same laterally along the shaft and tighten the seal between the sealing ring and the stationary surface.

2. In a pump casing equipped with a drive shaft extending thereinto, a rotary seal comprising a stainless steel plate carried by said casing and enclosing said drive shaft, a bronze sealing ring rotatably mounted on said shaft and engaging said plate, said ring being chamfered on its inner edges adjacent said drive shaft, a compressible annular resilient drive ring extending about said shaft adjacent said metal ring with one side of said drive ring in frictional engagement with said metal ring, said drive ring having a laterally flat outer peripheral surface, each of said rings being longitudinally slidable with respect to said shaft, a pumping impeller in said casing slidably mounted on said shaft and rotated thereby, said impeller being pressed against the other side of said drive ring to bring the sealing ring into sealing engagement with said plate to compress the ring laterally along the axis of said shaft and produce outward radial expansion thereof, the outer peripheral surface of the ring being free to move radially and being engaged only by liquid under pressure within said casing, the liquid exerting inward radial pressure on the periphery of the ring to urge the same toward lateral expansion whereby the seal between the sealing ring and the plate is tightened, and means for maintaining said impeller in position to compress said drive ring.

3. A device as set forth in claim 1, wherein the inner peripheral surface of the drive ring is substantially cylindrical and is in engagement throughout with the drive shaft.

CARL A. NAMUR.